Patented Nov. 8, 1938

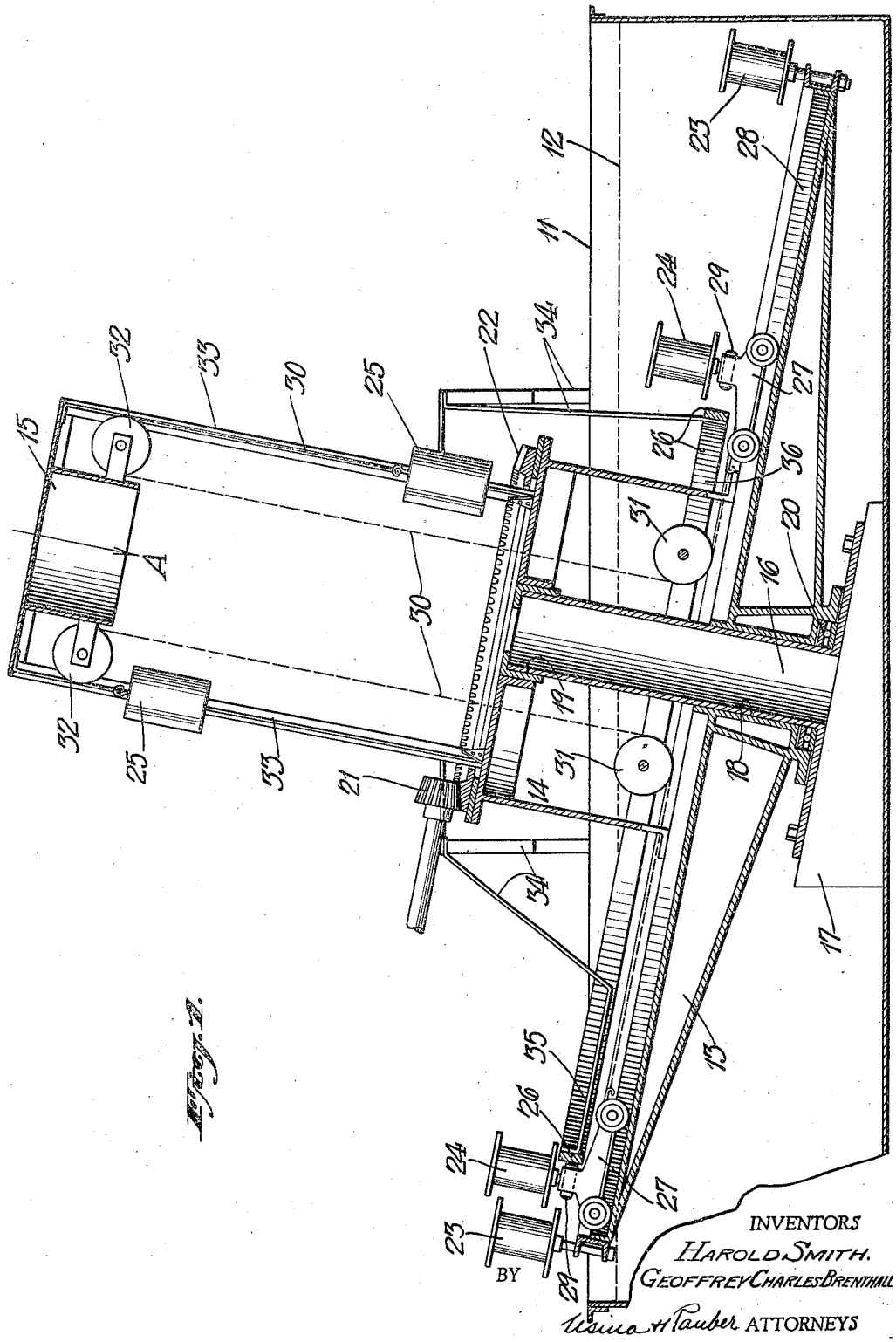

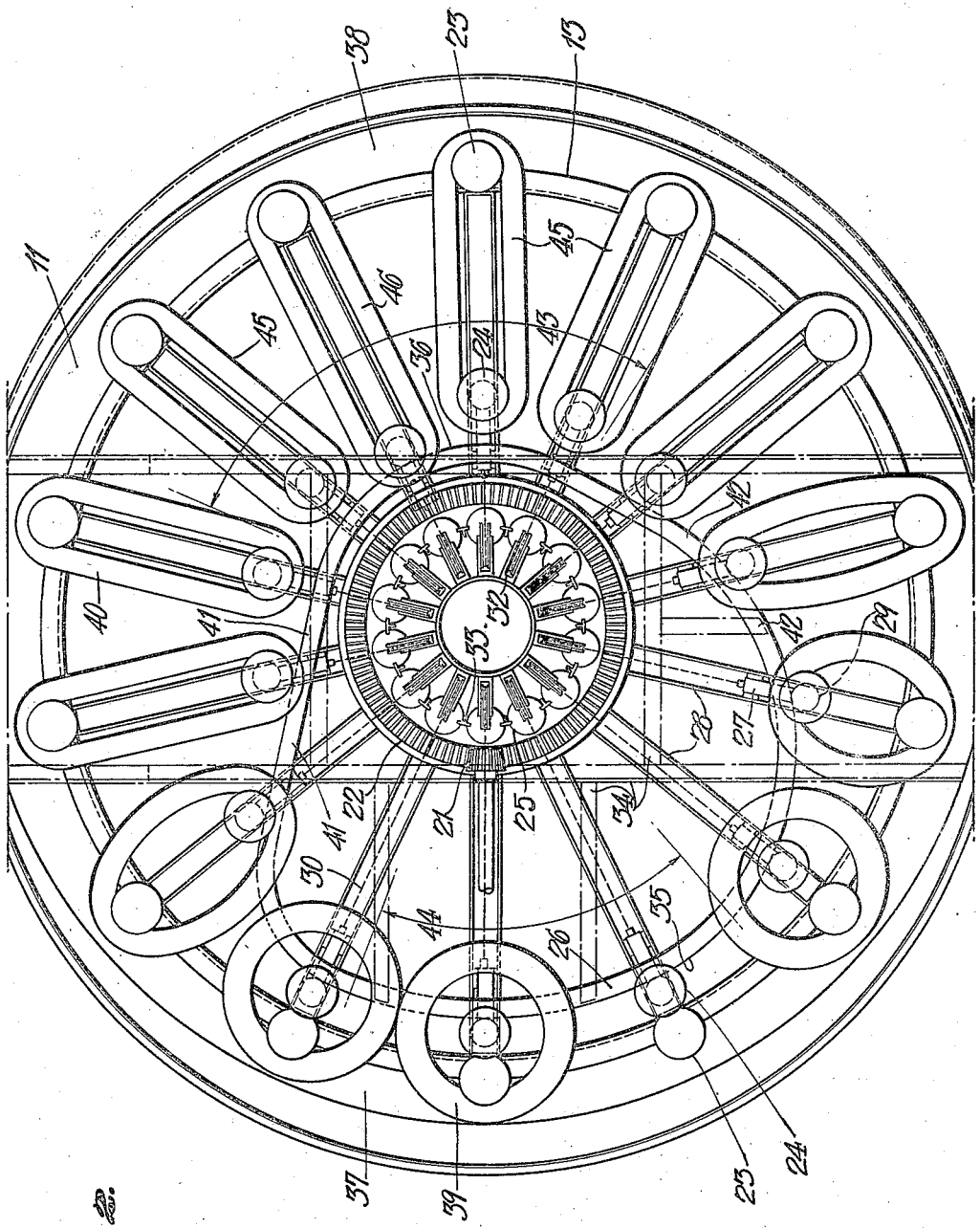

2,135,681

UNITED STATES PATENT OFFICE 2,135,681

IMMERSION APPARATUS FOR SUBAQUEOUS LEAK TESTING OF PNEUMATIC TIRE TUBES

Harold Smith, Sutton Coldfield, and Geoffrey Charles Brentnall, Erdington, Birmingham, England, assignors to Dunlop Rubber Company, Limited, Erdington, Birmingham, England, a British company Application January 11, 1937, Serial No. 119,894
In Great Britain January 15, 1936

13 Claims. (Cl. 73—51)

Our invention relates to apparatus for immersing inflated articles, such as tire tubes, into a liquid such as water and subjecting it to a predetermined stress in order to determine whether it contains any air or gas leaks.

Articles such as tire tubes, which are to be inflated with air or other gas under pressure are generally tested to insure against defects that would cause leakage of air or gas when in use. Such defects may be detected by immersing the article while inflated into a bath of water, whereupon the presence of the leak will be evident from the formation of bubbles at the leak. The detection of the leaks is facilitated and rendered more reliable if the tubes are stretched during immersion.

In our invention the tubes which may be of different sizes or characteristics may be supplied indiscriminately to the testing apparatus and are immersed under a predetermined load or tension uniform for all of the tubes within a predetermined limit of stretch.

In our invention the tubes are stretched or tensioned by a floating load such as a suspended mass, the weight of which is transmitted as a tension of the tube under test, thus providing a uniform load or tension regardless of the extent of stretch unless and until a predetermined limit is reached whereupon the load or weight is supported and further tensioning terminates.

In the preferred embodiment of the invention, the tubes to be tested are received successively on a pair of separable stretching elements, such as bollards, mounted on a rotating structure which is canted at such an angle relative to a bath of water that, in the upper position of the elements, the tubes may be easily positioned thereon and as the rotating structure rotates the tubes are stretched by separation of the stretching elements or bollards and immediately immersed in the water or other liquid. Upon further rotation of the rotating structure, the stretching elements are carried out of the water bath and the elements, or bollards, again brought close together to permit removal of the tube and replacement by another. The stretching elements of each pair are normally separated by a weight and at the loading position are brought close together by means of a cam. Preferably one bollard is fixed on the rotating element and the other slidable radially thereon under the actions of the weight and cam. The cam is so shaped that at the point where the bollards enter the bath, or immediately before this point, it releases the slidable bollard to the action of the weight.

Thereupon the weight separates the bollards until the tension on a tube mounted on them balances the weight. In the event that the tube stretches beyond a predetermined length before balancing the stretching of the weight, further stretching is stopped by the cam. A number of pairs of bollards or other stretching elements may be mounted in a circular series on the rotating structure.

The various features of the invention are illustrated by way of example in the accompanying drawings, in which—

Fig. 1 is a part cross-sectional elevation of the preferred embodiment of the invention, and Fig. 2 is a part plan view of the same as seen in the direction of the arrow A.

The embodiment illustrated comprises a water tank 11 in the confines of which rotates a structure canted at an angle to the water surface 12. As seen in Fig. 1 this structure comprises three main superposed parts viz. a base wheel 13, an intermediate column 14, and a super-structure 15.

These parts rotate as a unit on a central support 16 fixed to an inclined block 17, journal bearing being made at 18 and 19 and thrust bearing at 20. Drive is provided by a driven pinion 21 which engages a bevel wheel 22 carried by the column 14.

On the wheel 13 there are two circles of bollards 23 and 24, each rotatable on its respective axis and revolvable bodily in a circuit in the tank, the units 23 of the outer circle being disposed at fixed points on the wheel 13 and the units 24 of the inner circle being slidable radially to and from their complementary units 23 on the outer circle.

As to the floating load provision of the invention and the manner of controlling the same, in the preferred arrangement each sliding bollard 24 is attached to a weight 25 adapted to exert upon it a force tending to pull it away from its complementary fixed bollard 23, a stationary cam structure 26 being provided to control the operation of said weights.

As shown each sliding bollard 24 is mounted on a wheeled carriage 27 which reciprocates in a runway 28 arranged spoke-fashion upon the wheel 13. Said carriages may engage the cam 26, via rollers 29 for anti-friction purposes.

To these wheeled carriages 27 the weights 25 are attached by chains 30 which pass round wheels 31 and 32 mounted on the column 14 and on the super-structure 15 respectively.

Said super-structure 15 comprises a series of

T-piece guides 33 upon which the weights 25 are adapted to slide, said weights being grooved to make a sliding fit with said guides as shown in Fig. 2.

In Fig. 1, for the sake of clearness, only two pairs of bollards and their associated weights are shown, it being left to Fig. 2 to illustrate the plurality of the preferred arrangement.

The cam 26, which is stationary, is fixed by means of framework 34 to the tank 11 and comprises high and low points 35 and 36 disposed to coincide respectively with the loading and examination stations 37 and 38 upon opposite sides of the said tank.

The arrangement is preferably such that, at the loading station 37, the bollards of each respective pair are extremely close together, so much so indeed, that when flanged bollards are used the flanges of the respective bollards of a pair may overlap as shown in the drawings. The provisions of the present invention allow for this close approach of the bollards at the loading station together with the necessary degree of separation at the examining station, without any danger of the tube being over-stressed.

We will now describe the operation of the apparatus tracing the circuit of a given pair of bollards.

Starting at the loading point 37 they will be close together as referred to above. The floating load provided by the weights 25 is of course tending to separate them but they are restrained against separation by the high point 35 of the cam 26, which, as already indicated, coincides with the loading station 37.

The tube, having been first inflated, is placed, as shown at 39, loosely over the two bollards as the latter carried along on the rotary wheel 13, pass said loading station. Said bollards then move away round the tank on said wheel to the examining station 38 upon the opposite side of said tank.

As already indicated, said examining station 38 coincides with the low point of the cam, and it will be seen that reduction from high point to low point successively frees the sliding carriage from the restraint of the cam and so allows the weight 25 to lower, as shown at the right hand side of Fig. 1, to pull the sliding bollard 24 away from the fixed bollard 23 to stretch the tube as shown at 40.

This reduction in the cam is preferably rather sudden as shown at 41 so as to ensure that the tubes are stretched before they get well into the water.

Before the cam bulges again, as shown at 42, to its high point 35, it has a concentric dwell 43 which coincides with an arc of travel of the stretched and submerged tubes necessary for proper examination; said cam has a further concentric dwell 44 coinciding with an arc of travel—of the bollards when together—necessary for unloading and loading.

In most instances the tube itself supports the weight throughout the examination arc as shown at 45, the sliding carriage being entirely free of the cam; in this way we ensure that in all such instances the tubes are submitted to the same load and that they cannot be stretched to an amount greater than that determined by the weight.

Continued revolution of the bollards with the rotary wheel 13 brings the sliding carriage again into engagement with the cam, which bulges at 42, as already indicated, from its low point 36, coinciding with the examination station, to its high point 35, coinciding with the loading station.

As the sliding carriage gradually engages this bulge 42 the sliding bollard is pushed toward the fixed bollard, thereby lifting the weight as shown at the left hand side of Fig. 1; having arrived at the high point 35 of the cam, the bollards are again very close together and this allows the tested tubes to be readily removed.

It will be seen that the cam controls the action of the weights, in other words controls the imposition and release of the floating load according to the invention.

In one direction the cam successively engages the sliding carriage and pushes it towards the fixed bollard against the pull of the weight; in the other direction said cam successively releases the sliding carriage and allows the weight to pull said carriage away from the fixed bollard.

Thus in effect the bollards move relatively toward and away from each other under the influence of said cam and said weight respectively.

Occasionally a tube comes along which will not bear the weight without undue stretch; then the sliding carriage is supported, through the examination arc, upon the cam's concentric dwell 43 as shown at 46, it being arranged that the distance between the bollards in that condition is not such as deleteriously to stress the tube. This provision ensures that, although the unusual tube is not submitted to the full predetermined load, said tube still cannot be submitted to more than that load.

In general the cam and weight are so chosen and disposed as to provide for the necessary stressing not only of the more ordinary tubes but also of those tubes which are either more or less than ordinarily stretchable, and thus in general we provide apparatus which is applicable to an extremely wide range or variety of different tubes in a highly efficient and substantially foolproof manner.

Having now particularly described our said invention, we claim:—

1. Apparatus for immersing tubes under tension which comprises a pair of separable elements to receive the tube to be tested, means to separate said elements under constant tension, means to bring said elements toward each other against the action of said tensioning means and means to move said elements to immersing position while tensioned and out of immersion position when brought toward each other.

2. Apparatus for immersing tubes under tension which comprises a plurality of pairs of separable elements arranged in endless series to receive successive tubes to be tested, means to separate the elements of said successive pairs under constant uniform tension, means to bring the elements of each pair toward each other against the action of said tensioning means and means to move the pairs of elements in succession to immersing position while tensioned and to bring the elements toward each other when moving out of immersing position.

3. Apparatus for immersing inflated tire tubes under tension, which comprises a pair of elements to receive the tube to be tested, means comprising a weight to separate said elements to tension the tube, means to bring said elements toward each other, against the action of said tensioning means, and means to move said elements to immersing position while tensioned and out of immersing position when brought toward each other.

4. Apparatus for immersing tire tubes under tension which comprises a pair of elements to receive the tube to be tested, means comprising a weight to separate said elements until balanced by the tension of the tube received thereon, and a cam to bring said elements toward each other against the action of said weight.

5. Apparatus for immersing tubes under tension which comprises a water bath, a rotatable structure having a pair of tensioning elements thereon, positioned to dip into said water bath in one position of rotation of said structure and to be lifted out of said bath in another position of said structure, one of said tensioning elements being fixed on said rotating structure and the other being slidable thereon, a weight acting normally to draw said slidable element away from said fixed element and a cam for moving said slidable element towards said fixed element when out of immersing position.

6. Apparatus for immersing tire tubes under tension which comprises a water bath, a rotatable structure having an endless series of pairs of tensioning elements mounted thereon, said structure and elements being in such a position that the elements will be immersed in said bath, during an arc of rotation of said structure and will be moved out of said bath during the remainder of the rotation, one of said elements of each pair being fixed on said rotating structure and the other slidable radially thereon, weights normally acting to move said slidable elements away from said fixed elements and a cam to move the slidable element of each pair against the action of its weight toward the fixed element when moving through the arc outside of the immersing position.

7. Apparatus for immersing tire tubes under tension which comprises a water bath, a rotatable structure having an endless series of pairs of tensioning elements mounted thereon, said structure and elements being in such a position that the elements will be immersed in said bath, during an arc of rotation of said structure and will be moved out of said bath during the remainder of the rotation, one of said elements of each pair being fixed on said structure and the other slidable radially thereon, weights normally acting to move said slidable elements away from said fixed elements and a cam to move the slidable element of each pair against the action of its weight toward the fixed element when moving through the arc outside of the immersing position, said cam extending throughout the circuit of said structure.

8. Apparatus for immersing tubes under tension which comprises a rotating structure having a pair of separable tensioning elements, a water bath in which said pair of elements is immersed during a part of the rotation of said structure, constantly acting means to separate said elements under a uniform force and cam means to move said elements toward each other against the action of said force while out of immersing position.

9. Apparatus for immersing tire tubes under tension, which comprises a rotating structure, an endless series of separable elements on said structure, one element of each pair being fixed and the other slidable on said structure, a water bath, said structure and elements being so positioned with said water bath as to immerse said elements therein, during a part of the rotation of said structure, means constantly acting under uniform force for each of said pairs of elements to move said slidable element away from said fixed element and a cam means for moving said movable element against the action of said force towards said fixed element when out of immersing position.

10. Apparatus for stressing and immersing inflated articles which comprises a water bath, a structure having means to receive a series of said articles and carry them into and out of said water bath and comprising means acting on said receiving and carrying means to distort said articles under a stress as they enter said water bath and means to limit the stress to each article for all degrees of distortion.

11. Apparatus for stressing and immersing inflated articles which comprises a water bath, a structure having means to receive a series of inflated articles and to carry them in succession into and out of said water bath, and comprising means acting on said receiving and carrying means to distort said articles under tension within said bath and to release said tension on leaving said bath, means to limit the tension applied to each said article under distortion, and means for limiting the distortion of said articles to a predetermined limit.

12. The apparatus of claim 11, in which said receiving and carrying means for each article comprises a pair of separable bollards and said stress applying means comprises a suspended weight connected to one of said bollards.

13. The apparatus of claim 11, in which said distortion limiting means is a cam positioned to limit the movement of said distortion means.

HAROLD SMITH.
GEOFFREY CHARLES BRENTNALL.